(12) United States Patent
Kusuda

(10) Patent No.: US 8,472,786 B2
(45) Date of Patent: Jun. 25, 2013

(54) STEREOSCOPIC IMAGE DISPLAY CONTROL APPARATUS AND METHOD OF CONTROLLING OPERATION OF SAME

(75) Inventor: Daisuke Kusuda, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/498,315

(22) PCT Filed: Apr. 27, 2011

(86) PCT No.: PCT/JP2011/060681
§ 371 (c)(1),
(2), (4) Date: May 4, 2012

(87) PCT Pub. No.: WO2011/158573
PCT Pub. Date: Dec. 22, 2011

(65) Prior Publication Data
US 2012/0237179 A1    Sep. 20, 2012

(30) Foreign Application Priority Data
Jun. 17, 2010   (JP) .................................. 2010-138100

(51) Int. Cl.
*H04N 9/80*   (2006.01)
(52) U.S. Cl.
USPC ....................................................... 386/248
(58) Field of Classification Search
USPC ................. 386/239, 248, 278, 280, 326, 335, 386/336, 341
See application file for complete search history.

(56) References Cited

U.S. PATENT DOCUMENTS

| 6,201,517 | B1 | 3/2001 | Sato |
| 7,102,686 | B1 | 9/2006 | Orimoto et al. |
| 7,417,664 | B2 * | 8/2008 | Tomita ............................ 348/43 |
| 2002/0008906 | A1 * | 1/2002 | Tomita ......................... 359/462 |
| 2004/0233275 | A1 | 11/2004 | Tomita |
| 2006/0268159 | A1 | 11/2006 | Orimoto et al. |

FOREIGN PATENT DOCUMENTS

| JP | 6-194602 A | 7/1994 |
| JP | 10-239634 A | 9/1998 |
| JP | 11-355624 A | 12/1999 |
| WO | WO2004/084560 A1 | 9/2004 |
| WO | WO2008/126200 A1 | 10/2008 |

OTHER PUBLICATIONS

A 3D Online Monitoring System by Junichi Takeno, Toshihiro Enaka, and Hirofuji Sato (3rd International Conference on Sensing Technology, Nov. 30-Dec. 3, 2008, Tainan, Taiwan).*
International Search Report in PCT/JP2011/060681 dated Jul. 19, 2011 (English Translation Thereof).

* cited by examiner

*Primary Examiner* — Tat Chio
(74) *Attorney, Agent, or Firm* — McGinn IP Law Group, PLLC

(57) ABSTRACT

It is arranged so that a sense of discomfort will not be imparted to an individual observing a stereoscopic image. Cross-point information is recorded on a memory card on which stereoscopic moving image data has also been recorded. When the stereoscopic moving image is played back, an image representing a subject that is deeper than the cross point represented by the cross-point information is caused to blur. By causing blurring, the observer can be prevented from closely observing an image portion that exhibits too much parallax. Thus a sense of discomfort is not imparted to the observer.

7 Claims, 19 Drawing Sheets

```
HEADER
REFERENCE BLURRING AMOUNT FOR 42-INCH
DISPLAY SCREEN SIZE : D
CP INFORMATION
FIRST FRAME····2m
SECOND FRAME····2.1m
THIRD FRAME····2.3m
    ⋮

SCENE-CHANGE FRAME
134TH FRAME
1023RD FRAME
    ⋮
```

1ST FRAME     134TH FRAME

1ST FRAME

STEREOSCOPIC IMAGE DISPLAY CONTROL APPARATUS AND METHOD OF CONTROLLING OPERATION OF SAME

TECHNICAL FIELD

This invention relates to a stereoscopic image display control apparatus and to a method of controlling the operation of this apparatus.

BACKGROUND ART

By displaying on a display screen a left-eye image (an image observed by the left eye of the observer) and a right-eye image (an image observed by the right eye of the observer) having parallax, an image can be viewed stereoscopically. There are occasions where the user may find viewing unconformable if there is too much parallax. For this reason, there is a technique for applying blurring processing to areas where parallax separation is great (Japanese Patent Application No. 4-343685) and a technique for causing blurring of portions other than the portion at which the user is gazing (Japanese Patent Application No. 9-43468), etc.

However, with the technique of merely blurring areas where parallax separation is great, there are instances where the image cannot be enjoyed as a stereoscopic image and viewing becomes uncomfortable.

DISCLOSURE OF THE INVENTION

An object of the present invention is to display a stereoscopic image that is devoid of viewing discomfort.

A stereoscopic image display control apparatus according to the present invention is characterized by comprising: a stereoscopic image data reading unit (stereoscopic image data reading means) for reading stereoscopic image data representing a stereoscopic image that has been recorded on a recording medium; a cross-point information reading unit (cross-point information reading means) for reading cross-point information that has been recorded on the recording medium and that represents a cross point at which parallax of the stereoscopic image vanishes; a first blurring unit (first blurring means) for blurring an image portion, which represents a subject at a position deeper than the cross point represented by the cross-point information read by the cross-point information reading unit, in the stereoscopic image represented by the stereoscopic image data read by the stereoscopic image data reading unit, in such a manner that the deeper the subject relative to the cross point, the greater the amount of blurring becomes; and a display control unit (display control means) for controlling a display device so as to display the stereoscopic image in which the image portion representing the subject at the deeper position has been blurred by the first blurring unit.

The present invention also provides an operation control method suited to the above-described stereoscopic image display control apparatus. Specifically, the method comprises: reading, by a stereoscopic image data reading unit, stereoscopic image data representing a stereoscopic image that has been recorded on a recording medium; reading, by a cross-point information reading unit, cross-point information that has been recorded on the recording medium and that represents a cross point at which parallax of the stereoscopic image vanishes; blurring, by a first blurring unit, an image portion, which represents a subject at a position deeper than the cross point represented by the cross-point information read by the cross-point information reading unit, in the stereoscopic image represented by the stereoscopic image data read by the stereoscopic image data reading unit, in such a manner that the deeper the subject relative to the cross point, the greater the amount of blurring becomes; and controlling, by a display control unit, a display device so as to display the stereoscopic image in which the image portion representing the subject at the deeper position has been blurred by the first blurring unit.

In accordance with the present invention, stereoscopic image data and cross-point information have been recorded on a recording medium. The stereoscopic image data and cross-point information are read from the recording medium and an image portion in the stereoscopic image representing a subject at a position deeper than the cross point, which is represented by the cross-point information, is caused to blur in such a manner that the deeper into the stereoscopic image from the cross point, the more the amount of blurring applied. The stereoscopic image thus blurred is displayed. If an image portion representing a subject shallower that the cross point is caused to blur, there are instances where the resulting image cannot be enjoyed as a stereoscopic image. In accordance with the present invention, however, an image portion representing a subject shallower that the cross point is not caused to blur. Even if blurring processing is applied, therefore, the resulting image can be enjoyed as a stereoscopic image. Furthermore, although the deeper into the stereoscopic image from the cross point, the greater the amount of parallax becomes, the adverse effect of this parallax upon the observer can be mitigated because the amount of blurring also increases the greater the distance inward from the cross point.

By way of example, the first blurring unit blurs an image portion, which represents a subject at a position deeper than the cross point detected by the cross point detection unit in the stereoscopic image, in such a manner that the larger a display screen of the display device, the more the amount of blurring becomes.

The apparatus may further comprise: a parallax determination unit (parallax determination means) for determining whether parallax of an image portion representing a subject at a position shallower than the cross point in the stereoscopic image is equal to or greater than a threshold value; and a cross-point control unit (cross point control means), responsive to a determination by the parallax determination unit that parallax of an image portion representing a subject at a position shallower than the cross point is equal to or greater than the threshold value, for controlling the stereoscopic image data so as to move the cross point to an image portion representing a subject shallower than the position of the cross point represented by the cross-point information read by the cross-point information reading unit in the stereoscopic image.

The stereoscopic image is an image of a single frame constituting a stereoscopic moving image, the stereoscopic image data reading unit reads stereoscopic image data, which represents stereoscopic images of a number of frames, from the recording medium, and scene-change information representing a frame of the stereoscopic image at which a scene of the stereoscopic image changes has been recorded on the recording medium, and the apparatus further comprises: a scene-change information reading unit (scene-change reading means) for reading the scene-change information from the recording medium; and a second blurring unit (second blurring means) for blurring the entirety of stereoscopic images of scene-change frames which are one or a plurality of frames preceding and following a frame of the stereoscopic image represented by scene-change information read by the scene-change information reading unit. In this case, the display control unit would control the display device so as to display stereoscopic images, which have been blurred by the first blurring unit, with regard to stereoscopic images of frames other than the scene-change frame, and so as to display stereoscopic images, which have been blurred by the first and second blurring units, with regard to the stereoscopic images of the scene-change frames.

By way of example, the display control unit controls the display device so as to display the stereoscopic images in such a manner that stereoscopic images of the scene-change frames are gradually reduced from large to small up to a stereoscopic image preceding the stereoscopic image in which the scene of the stereoscopic image changes, and are gradually enlarged from small to large following the stereoscopic image in which the scene of the stereoscopic image changes.

The apparatus may further comprise a second blurring unit (second blurring means) for blurring an image portion, which represents a subject at a position shallower than the cross point represented by the cross-point information read by the cross-point information reading unit, in the stereoscopic image represented by the stereoscopic image data read by the stereoscopic image data reading unit, in such a manner that the shallower the subject relative to the cross point, the more the amount of blurring becomes. The second blurring unit may be the same as or separate from the first blurring unit.

BEST MODE FOR CARRYING OUT THE INVENTION

Figure 1:
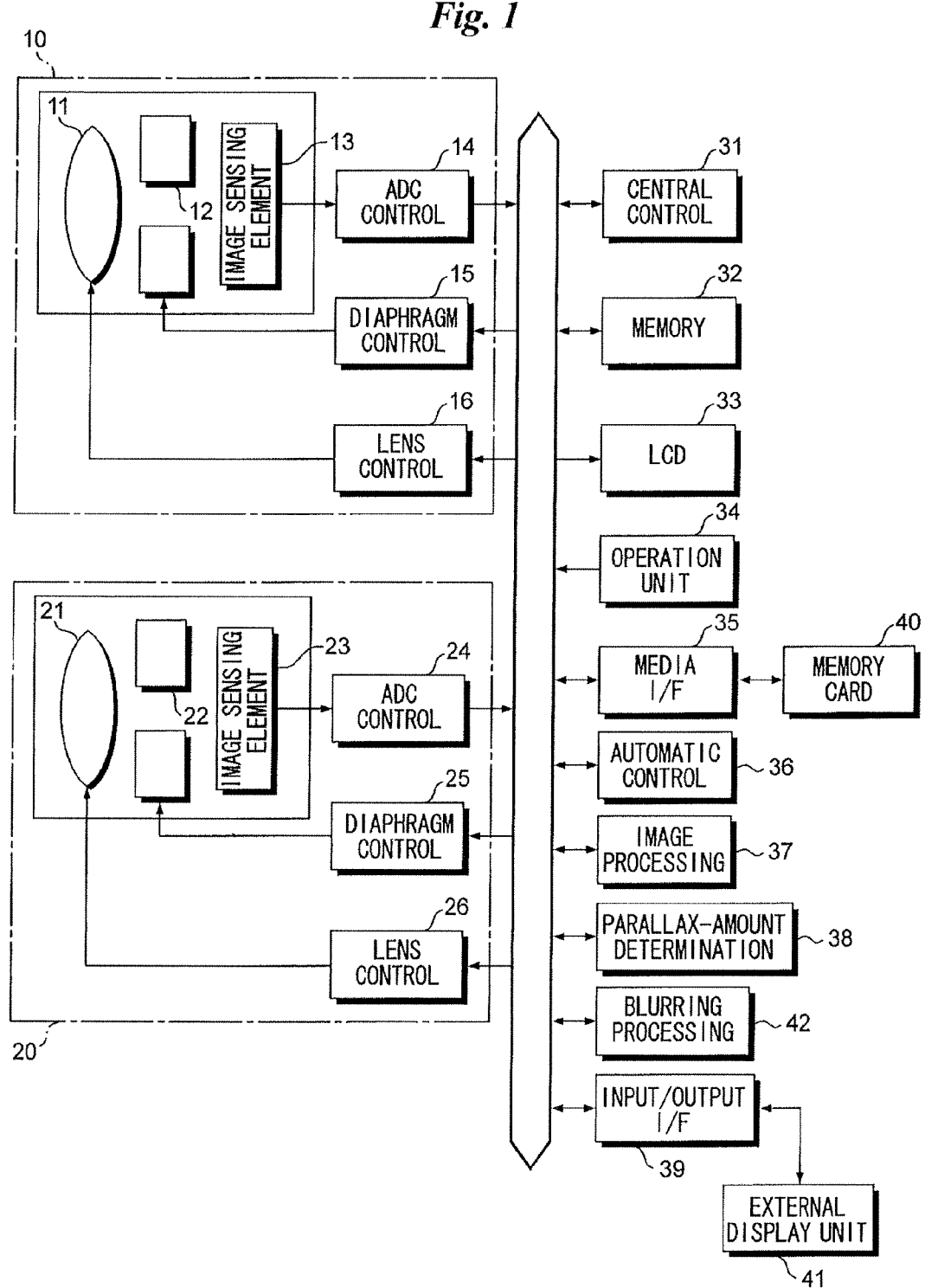
FIG. 1 is a block diagram illustrating the electrical configuration of a stereoscopic imaging digital camera.

FIG. 1 is a block diagram illustrating the electrical configuration of a stereoscopic moving-image imaging digital camera.

The operation of the stereoscopic moving-image imaging digital camera is controlled by a central control unit 31. The stereoscopic moving-image imaging digital camera also includes a memory 32, which stores prescribed data, and an automatic control unit 36.

The stereoscopic moving-image imaging digital camera includes a first imaging unit 10 for capturing a moving image for the right eye, and a second imaging unit 20 for capturing a moving image for the left eye.

The first imaging unit 10 includes a first image sensing element 13 such as a CCD or C-MOS. An imaging lens 11 and a diaphragm 12 are provided in front of the first image sensing element 13. The imaging lens 11 is positioned by a lens control unit 16. The diaphragm 12 has its aperture controlled by a diaphragm control unit 15. A right-eye video signal representing the image of a subject captured by the first image sensing element 13 is input to an ADC (Analog-Digital Converter) control unit 14. Prescribed processing such as analog/digital conversion processing is executed in the ADC control unit 14, whereby a conversion is made to moving image data representing the moving image for the right eye.

The second imaging unit 20 also includes a second image sensing element 23. An imaging lens 21 and a diaphragm 22 are provided in front of the second image sensing element 23. The imaging lens 21 is positioned by a lens control unit 26. The diaphragm 22 has its aperture controlled by a diaphragm control unit 25. A left-eye video signal representing the image of a subject captured by the left image sensing element 23 is subjected to prescribed processing such as analog/digital conversion processing in an ADC control unit 24, whereby a conversion is made to moving image data representing the moving image for the right eye.

When an imaging mode is set in an operation unit 34, the right-eye moving image data that has been output from the ADC control unit 14 and the left-eye moving image data that has been output from the ADC control unit 24 are subjected to prescribed image processing in an image processing unit 37 and then input to a liquid crystal display device 33. The captured image of the subject is displayed in the form of a moving image. An external display unit 41 can also be connected to the stereoscopic imaging digital camera. In order to connect the external display unit 41 to the stereoscopic imaging digital camera, the stereoscopic imaging camera is provided with an input/output interface 39. By connecting the external display unit 41 to the input/output interface 39, the stereoscopic image (stereoscopic moving image) obtained (reproduced) by imaging is displayed on the display screen of the external display unit 41.

When a recording mode is set in the operation unit 34, the right-eye moving image data that has been output from the ADC control unit 14 and the left-eye moving image data that has been output from the ADC control unit 24 are input to a parallax-amount determination unit 38.

The parallax-amount determination unit 38 determines whether a portion of the image of the subject having parallax equal to or greater than a prescribed threshold value is included in one frame of a stereoscopic image (one set of an image for the left eye and image for the right eye) constituting the stereoscopic moving image. With regard to a stereoscopic image that includes a portion of the image of the subject having parallax equal to or greater than the prescribed threshold value, a parallax adjustment is applied to the one set of images for the left eye and right eye, which represents this stereoscopic image, in such a manner that the stereoscopic image will not include the portion of the image of the subject having parallax equal to or greater than the prescribed threshold value.

The image data for the left eye and the image data for the right eye obtained by imaging are applied to a memory card 40 via a media interface 35 and are recorded on the memory card 40 as stereoscopic image data. In a case where the parallax adjustment has been applied, it goes without saying that the parallax-adjusted left-eye image and right-eye image are recorded on the memory card 40 of the left-eye image data and right-eye image data representing the respective left- and right-eye images. By recording the left-eye image data and right-eye image data on the memory card 40 frame by frame, moving image data (moving image data for the left eye and moving image data for the right eye) representing a stereoscopic moving image is recorded on the memory card 40.

In this embodiment, cross-point information representing a cross point that indicates a location where parallax is not produced is also recorded on the memory card 40 in addition to the moving image data representing the stereoscopic moving image. In this embodiment, the cross point is predetermined (at a distance of 2 m in front of the stereoscopic imaging digital camera, by way of example). Normally a subject is imaged so as to eliminate parallax at the location decided by the cross point. However, in a case where parallax equal to or greater than the prescribed threshold value occurs, as mentioned above, the parallax adjustment is applied to the left- and right-eye images representing the stereoscopic image of the frame. As a result, the position of the cross point shifts as well. In this embodiment, cross-point information is recorded on the memory card 40 in correspondence with frames of the stereoscopic image constituting the stereoscopic moving image. Naturally, it may be arranged so that cross-point information is recorded frame by frame only for frames of the stereoscopic image in which a predetermined cross point has shifted, without recording cross-point information frame by frame in correspondence with the frames. In this case, it goes without saying that cross-point information representing the predetermined cross point also is recorded on the memory card 40.

Figure 2:
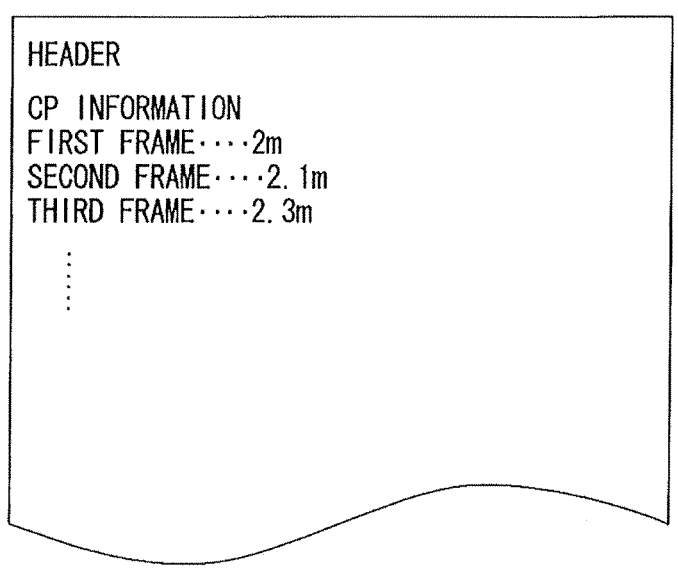
FIG. 2 illustrates the contents of a header.

FIG. 2 illustrates the header of a file (a file containing stereoscopic moving image data) in which cross-point (CP) information has been recorded. The cross-point information may just as well be recorded in an image data recording area of the file and not in the header.

Cross points of first, second and third frames constituting a stereoscopic moving image are at 2 m, 2.1 m and 2.3 m, respectively, and these items of cross-point information have been recorded on the memory card 59. Cross-point information has been recorded with regard to other frames as well.

With reference again to FIG. 1, the stereoscopic imaging digital camera also has a playback function. Stereoscopic moving image data representing a stereoscopic moving image recorded on the memory card 40 is read from the memory card 40 via the media interface 35. The stereoscopic moving image data that has been read is applied to the liquid crystal display device 33. The stereoscopic moving image represented by the stereoscopic moving image data is displayed on the display screen of the liquid crystal display device 33. As mentioned above, the stereoscopic imaging digital camera can also be connected to the external display unit 41, and the stereoscopic moving image represented by the stereoscopic moving image data that has been recorded on the memory card 40 can also be displayed on the external display unit 41. In this case, the stereoscopic moving image data that has been read from the memory card 40 is applied to the external display unit 41 via the input/output interface 39. The stereoscopic moving image is displayed on the external display unit 41 as a result.

If there is inclusion of a portion exhibiting large parallax, there will be instances where the observer viewing the stereoscopic image will find viewing uncomfortable. In accordance with this embodiment, an image portion representing a subject at a position deeper than the cross point in the stereoscopic image is caused to blur. Since the image portion representing the subject at this deep position is blurred in this manner, the observer can be prevented from closely observing this image portion. Since blurring is not applied to an image portion representing a subject at a position shallower than the cross point in the stereoscopic image, the image is displayed stereoscopically. Since the display screen of the liquid crystal display device 33 provided on the back of the stereoscopic imaging digital camera is comparatively small, there is not a large amount of parallax. However, since the display screen of the external display unit 41 is comparatively large, the amount of parallax also is greater and the observer may find viewing uncomfortable. This embodiment is effective in a case where a stereoscopic image is displayed on a comparatively large display screen such as that of the external display unit 41. The blurring processing can utilize a smoothing filter and can also be implemented by software. The stereoscopic imaging digital camera is provided with a blurring processing unit 42 in order to execute blurring processing.

Figure 3:
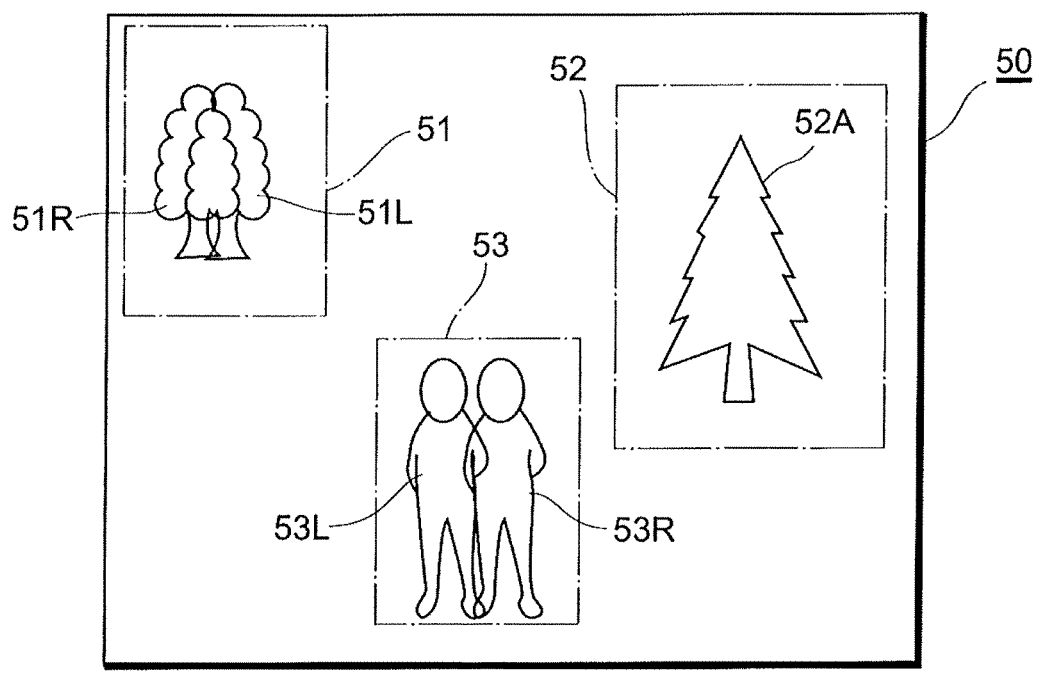
FIG. 3 is an example of a stereoscopic image.

FIG. 3 is an example of a reproduced stereoscopic image.

This stereoscopic image 50 is represented by superimposing an image for the left eye and an image for the right eye. The left-eye image and right-eye image may be superimposed simultaneously, or it will suffice if the left-eye image and right-eye image can be seen by the observer in essentially superimposed form by displaying them with a temporal shift.

The stereoscopic image 50 contains a first area 51 at the upper left, a second area 52 at the upper right and a third area 53 in front. The second area 52 is an area in which the cross point is located. The first area 51 is an area farther (deeper) than the cross point, and the third area 53 is an area nearer (shallower) than the cross point.

The second area 52 includes an image 52A of a tree. Since the second area 52 is the area having the cross point, the image 52A of the tree is devoid of parallax (this image is not expressed by images offset to the left and right). The first area 51 includes tree images 51L and 51R offset to the left and right. One tree image 51L is represented by an image for the left eye, and the other tree image 51R is represented by an image for the right eye. Parallax is produced between the tree images 51L and 51R. The third area 53 includes person images 53L and 53R offset to the left and right. One person image 53L is represented by an image for the left eye, and the other person image 53R is represented by an image for the right eye. In this embodiment, blurring processing is applied to the images 51L and 51R representing a subject farther than the cross point.

Parallax is utilized in order to find an image portion farther than the cross point in the stereoscopic image.

Figure 4:
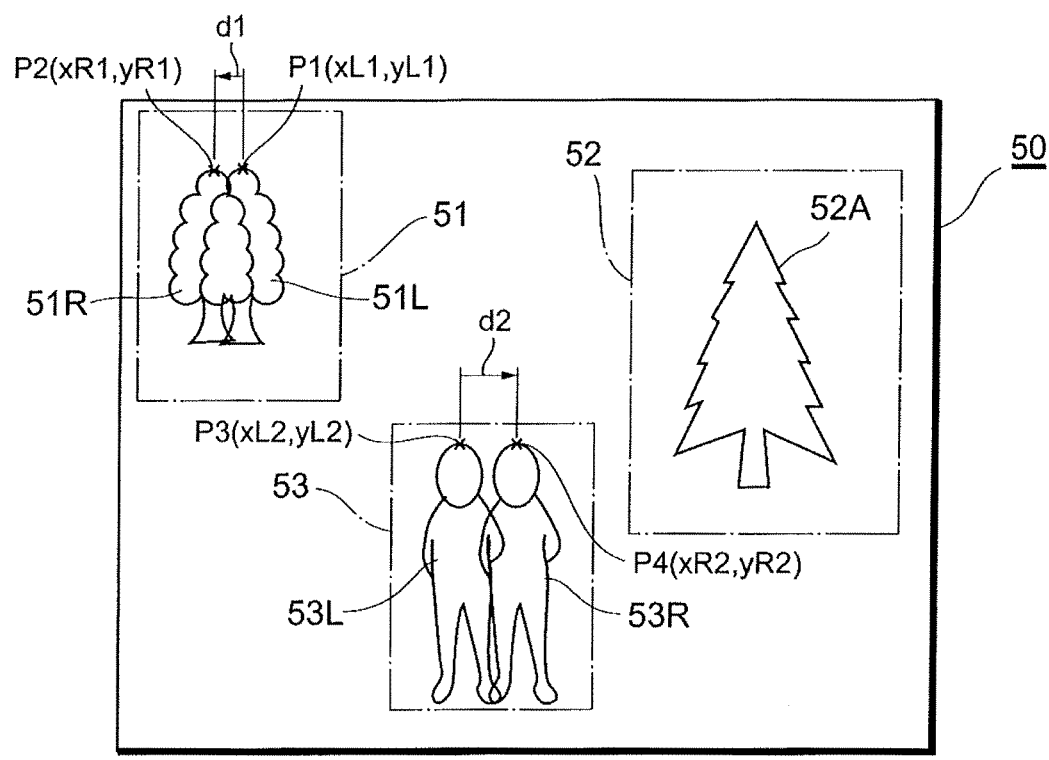
FIG. 4 is an example of a stereoscopic image.

FIG. 4 is an example of a stereoscopic image for describing parallax. Items in FIG. 4 identical with those shown in FIG. 3 are designated by like reference characters and a description thereof is omitted.

Consider the image for the left eye as a reference. It is also permissible to consider the image for the right eye as the reference. Consider a specific pixel P1 in the tree image 51L contained in the first area 51. A pixel P2 corresponding to the pixel P1 is found in the other tree image 51R. If we let (xL1, yL1) be the position of the pixel P1 and let (xR1, yR1) be the position of the pixel P2, then parallax d1 will be d1=(xL1−xR1). Parallax d1 is positive. Since parallax d1 is positive, it is judged that the subject represented by pixels P1, P2 is farther than the cross point. Similarly, consider a specific pixel P3 in the person image 53L contained in the third area

53. A pixel P4 corresponding to the pixel P2 is found in the other person image 53R. If we let (xL2, yL2) be the position of the pixel P3 and let (xR2, yR2) be the position of the pixel P4, then parallax d2 will be d2=(xL2−xR2). Parallax d2 is negative. Since parallax d2 is negative, it is judged that the subject represented by pixels P3, P4 is nearer than the cross point. Such processing is executed with regard to the entirety of the stereoscopic image 50 and an image portion representing a subject farther (deeper) than the cross point and an image portion representing a subject nearer (shallower) than the cross point are found in the stereoscopic image 50. Naturally, within an area considered to be that of the same subject-image portion, such processing may be executed at one pixel or at a plurality of pixels within this area and an image within the area may be judged to be farther than or nearer than the cross point depending upon the result.

Figure 5:
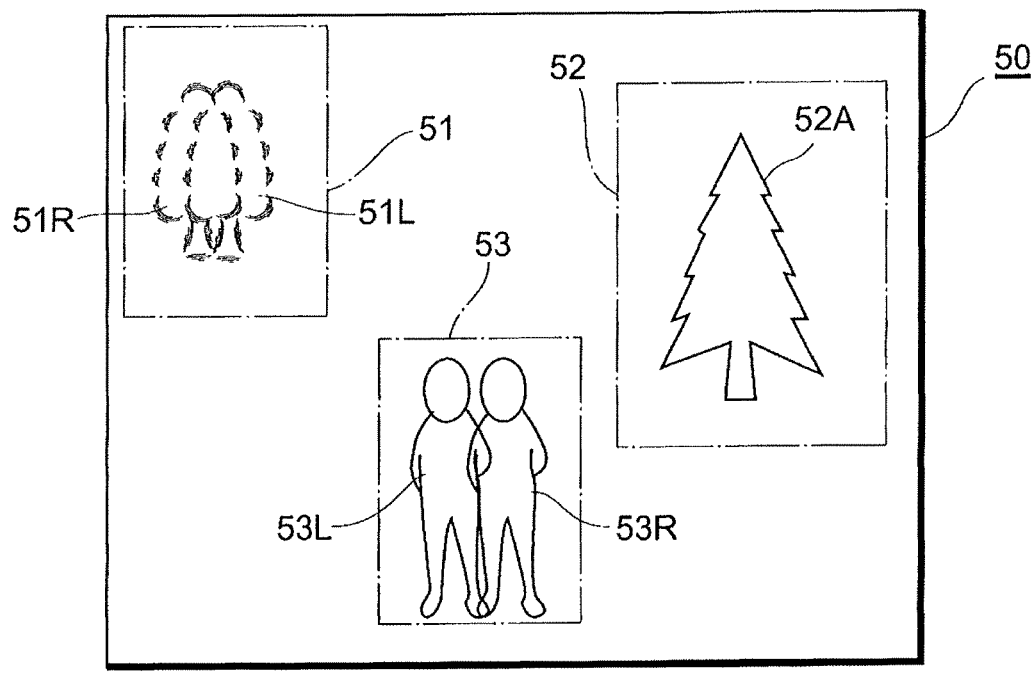
FIG. 5 is an example of a stereoscopic image.

FIG. 5 is an example of a reproduced stereoscopic image.

As mentioned above, the second area 52 is an area of the cross point, the first area 51 is an area representing the subject farther than the cross point, and the third area 53 is an area nearer than the cross point. Since the first area 51 is an area representing the subject farther than the cross point, the images 51R and 51L within the area 51 have been caused to blur. As a result, the observer can be prevented from closely observing the images 51R and 51L within the area 51.

Figure 6:
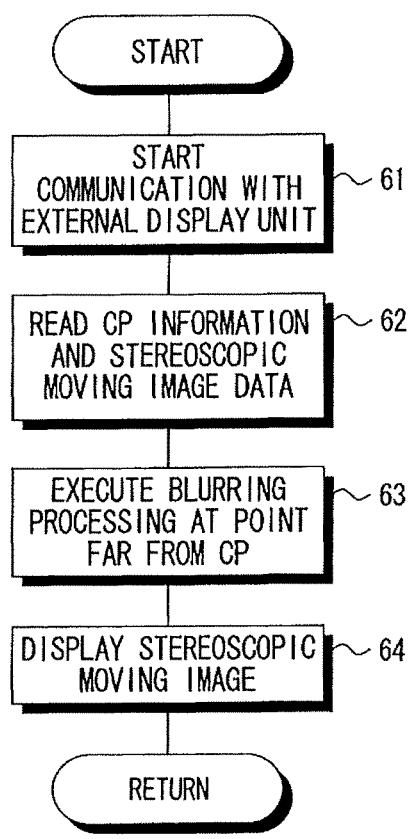
FIG. 6 is a flowchart illustrating a playback processing procedure.

FIG. 6 is a flowchart illustrating a playback processing procedure.

The stereoscopic imaging digital camera and the external display apparatus (e.g., a television apparatus) 41 are connected and begin communicating (step 61). Cross-point information and stereoscopic moving image data are read from the memory card 40 (step 62). With regard to each frame of a stereoscopic image that constitutes the stereoscopic moving image represented by the stereoscopic moving image data, an image portion farther than the cross point is found and blurring processing is applied to the image portion found (step 63), as described above. Stereoscopic images blurred with regard to image portions farther than the cross point are displayed successively on the external display unit 41, whereby a stereoscopic moving image is displayed (step 64).

Although the embodiment described above concerns a stereoscopic moving image, it goes without saying that the invention is not limited to a stereoscopic moving image and similar processing can be applied to a stereoscopic still image as well.

Figure 7:
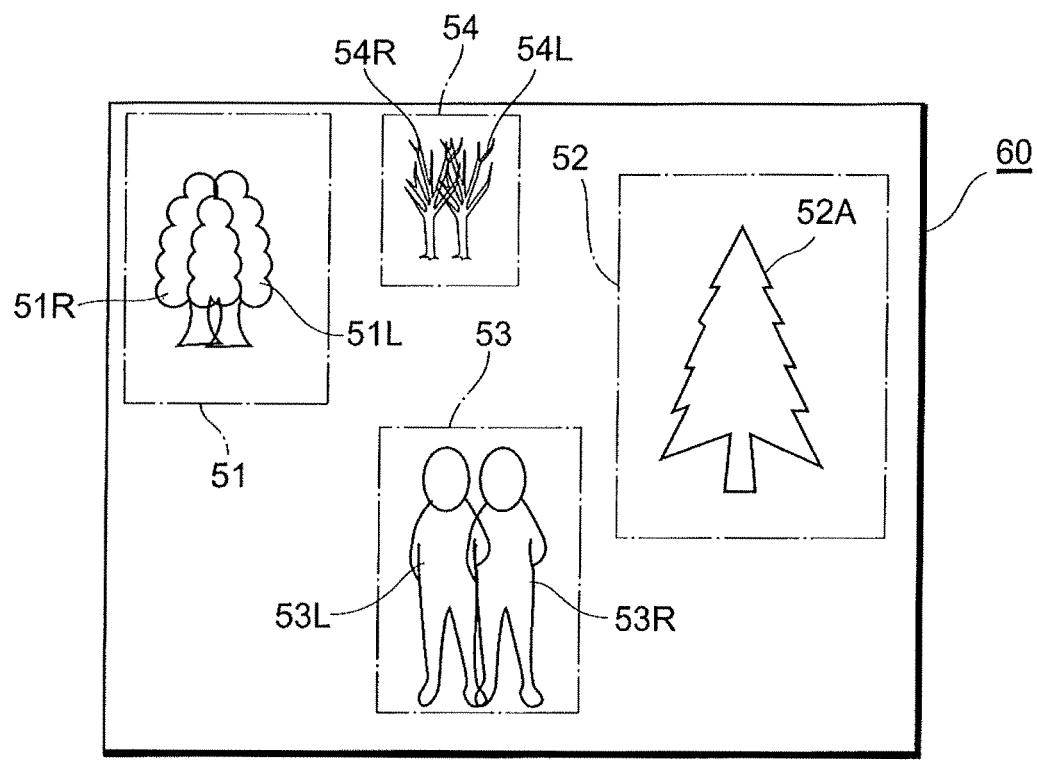
FIG. 7 is an example of a stereoscopic image.
Figure 8:
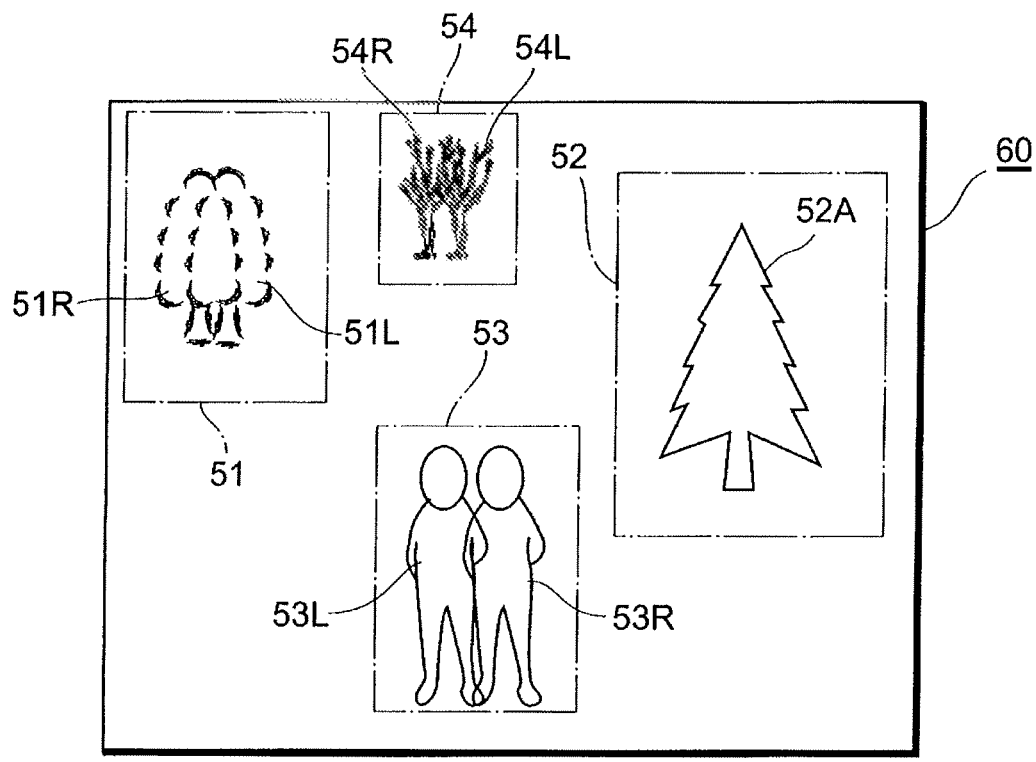
FIG. 8 is an example of a stereoscopic image.
Figure 9:
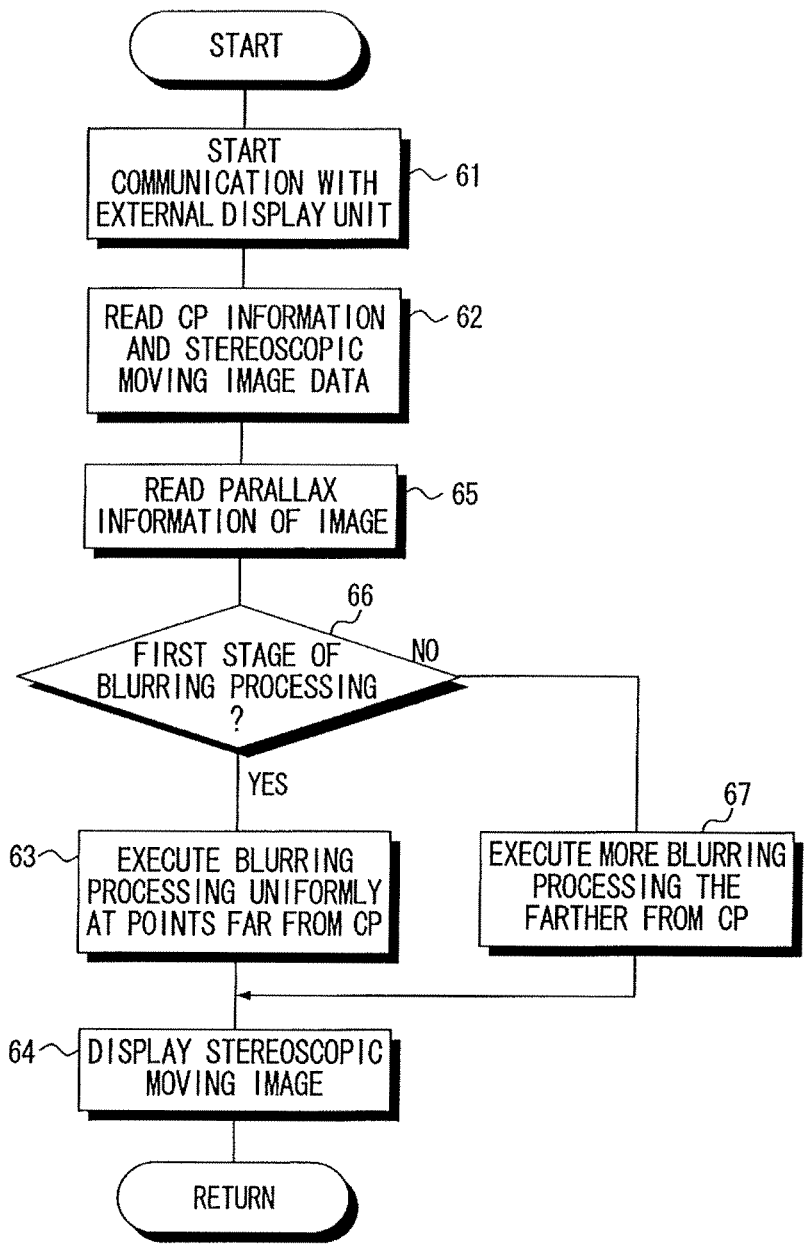
FIG. 9 is a flowchart illustrating a playback processing procedure.

FIGS. 7 to 9 illustrate another embodiment. In the embodiment set forth above, an image portion representing a subject at a position farther than the cross point is caused to blur. In this embodiment, the farther an image portion is from the cross point, the greater the amount of blurring applied.

FIG. 7 illustrates an example of a reproduced stereoscopic image. Items in FIG. 7 identical with those shown in FIG. 3 are designated by like reference characters and a description thereof is omitted.

A stereoscopic image 60 contains a fourth area 54 in addition to the first area 51, second area 52 and third area 53. The fourth area 54 includes an image 54L of a tree for the left eye and an image 54R of the tree for the right eye. A subject represented by these images 54L and 54R is located at a position farther than the subject represented by the images 51L and 51R included in the first area 51.

FIG. 8 is an example of a stereoscopic image that has been subjected to blurring processing.

As mentioned above, the tree images 51L and 51R within the first area 51 and the tree images 54L and 54R within the second area 54, which represent subjects farther than the cross point, have all been blurred. However, since the subject represented by the tree images 54L and 54R within the second area 54 is farther than the subject represented by the tree images 51L and 51R within the first area 51, the amount of blurring applied to it is greater.

Although the deeper into the stereoscopic image from the cross point, the greater the parallax, the deeper into the stereoscopic image, the greater the amount of blurring applied. Thus it can be arranged so that an image portion exhibiting large parallax will not be observed closely.

FIG. 9, which corresponds to FIG. 6, is a flowchart illustrating a playback processing procedure. Processing in FIG. 9 identical with that shown in FIG. 6 is designated by like reference characters and a description thereof is omitted.

In this embodiment, it is assumed that information representing the parallax of images has been generated in advance and that this information representing parallax has been recorded on the memory card 40 in correspondence with each frame of a stereoscopic image that constitutes a stereoscopic moving image, as described above. It goes without saying that it may be arranged so that parallax is calculated at the time of playback without information representing parallax having been recorded on the memory card 40 beforehand.

Cross-point information, stereoscopic moving image data and information representing parallax are read from the memory card 40 (steps 62, 65).

Next, it is judged whether blurring processing is that of a first stage (step 66). Whether blurring processing is that of a first stage is decided by a setting made at the operation unit 34. If blurring processing has been set to a first stage by the operation unit 34 ("YES" at step 66), then image portions representing subjects far from the cross point are subjected to uniform blurring processing (step 63) in the manner described above. If blurring processing has not been set to the first stage by the operation unit 34 ("NO" at step 66), then blurring processing is executed in such a manner that the more an image portion represents a subject deeper than the cross point, the more the amount of blurring is increased (step 67).

Figure 10:
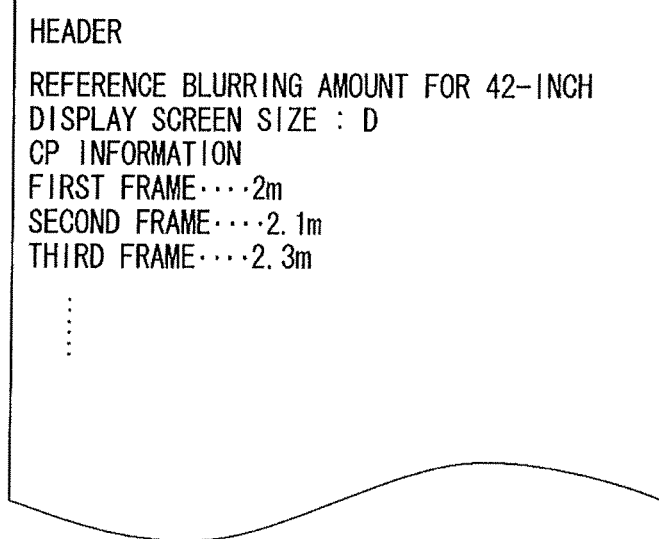
FIG. 10 illustrates the contents of a header.
Figure 11A:
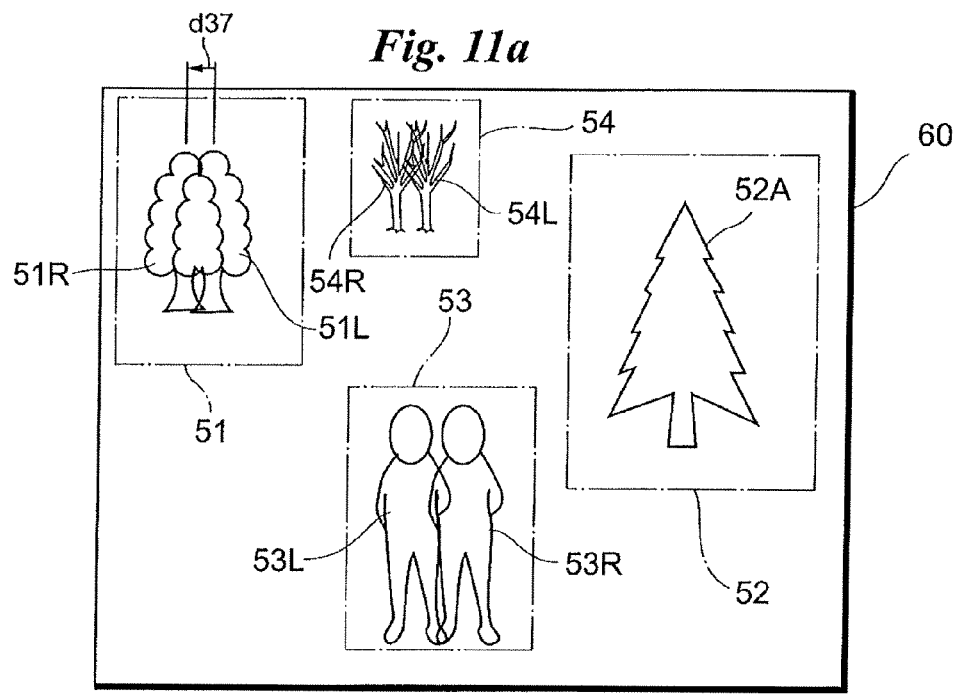
FIGS. 11a and 11b are examples of stereoscopic images.
Figure 11B:
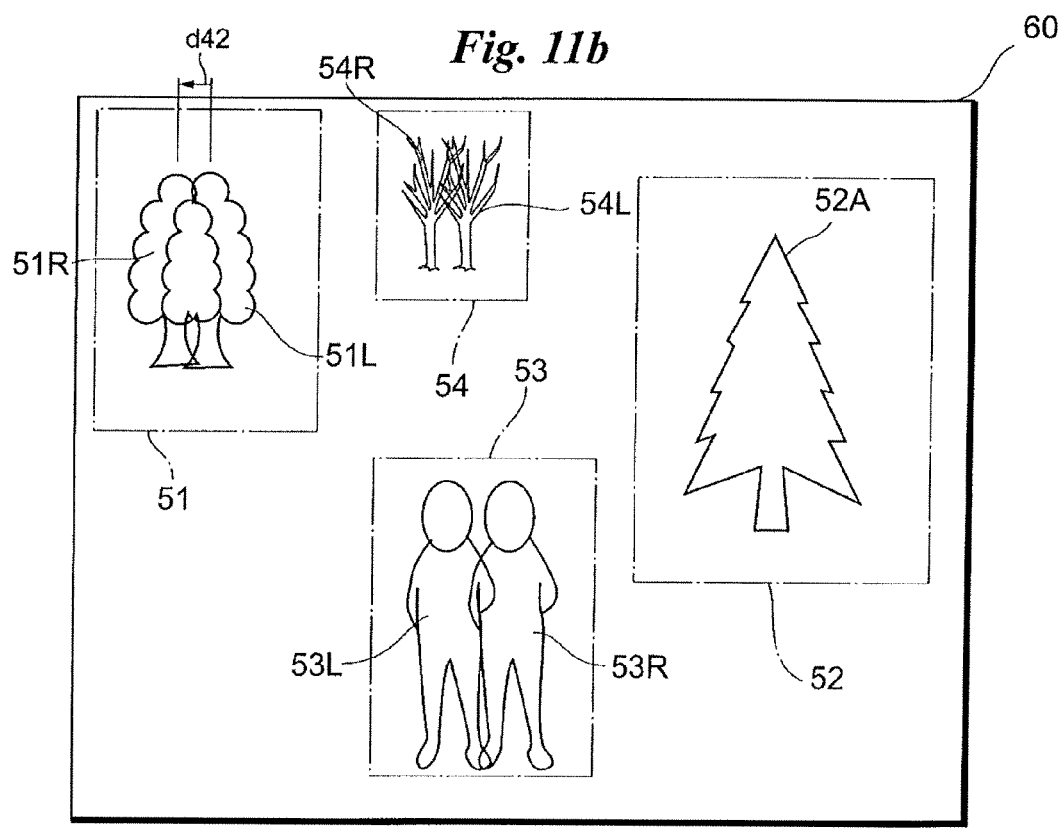
Figure 12:
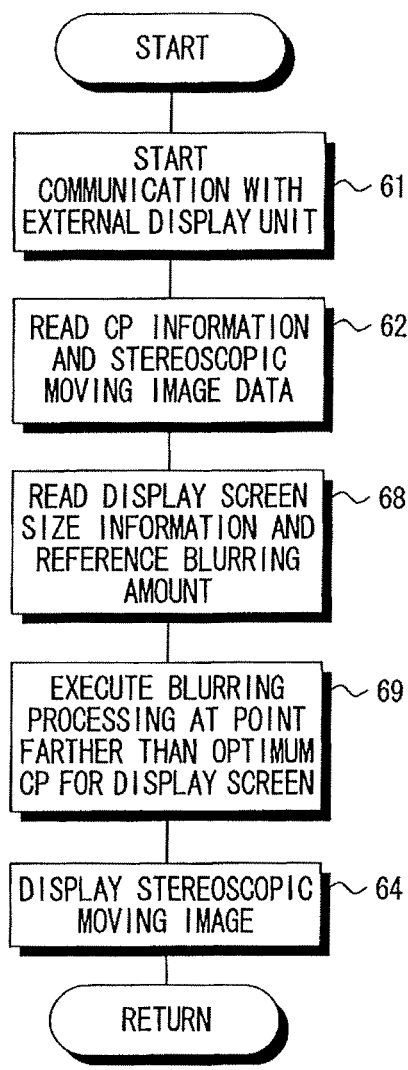
FIG. 12 is a flowchart illustrating a playback processing procedure.

FIGS. 10 to 12 illustrate another embodiment. This embodiment changes the amount of blurring in accordance with the size of the display screen that displays the stereoscopic image. The amount of blurring may just as well be changed in accordance with the display screen size while changing the amount of blurring the deeper an image portion is from the cross point in the manner described above.

FIG. 10 illustrates the contents of the header of a file in which the above-mentioned cross-point information has been recorded.

In this embodiment, a reference amount of blurring with respect to a prescribed display screen size has been stored in addition to the above-mentioned cross-point information. For example, a reference amount of blurring is represented by D in case of a 42-inch display screen size.

FIGS. 11a and 11b are examples of reproduced stereoscopic images. Items in these figures identical with those shown in FIG. 8 are designated by like reference characters and a description thereof is omitted.

FIG. 11a is the example of the stereoscopic image 60 displayed on the display screen of a 37-inch, and FIG. 11b is the example of the stereoscopic image 60 displayed on the display screen of a 42-inch.

The larger the image displayed, the greater parallax becomes. For example, in FIG. 11a, assume that the parallax between the images 51L and 51R within the first area 51 is d37, and in FIG. 11b, assume that the parallax between the images 51L and 51R within the first area 51 is d42. In such case, d42>d37 holds. In this embodiment, the larger the display screen size and the greater the parallax, the more the amount of blurring becomes, and the smaller the display screen size and the smaller the parallax, the smaller the amount of blurring becomes. For example, if we assume that the amount of blurring prevailing when a stereoscopic image is displayed on the 42-inch display screen is the blurring amount D, as mentioned above, then the amount of blurring that prevails when the stereoscopic image is displayed on a 37-inch display screen will be (37-inch size/42-inch size)×D.

FIG. 12, which corresponds to FIG. 6, is a flowchart illustrating a playback processing procedure. Processing in FIG. 12 identical with that shown in FIG. 6 is designated by like reference characters and a description thereof is omitted.

The stereoscopic imaging digital camera and the external display apparatus 41 are connected, size information representing the size of the display screen of external display unit 41 is read from the external display unit 41 and a reference blurring amount that has been recorded on the memory card 40 is read (step 68). A cross point that matches the size of the display screen represented by the read size information is calculated. The image for the left eye and the image for the right eye are adjusted in such a manner that the parallax at the calculated cross point vanishes. Further, a blurring amount matching the display screen that displays the stereoscopic image is calculated from the read reference blurring amount. A subject located at a position farther than the calculated cross point is caused to blur at the blurring amount calculated from the reference blurring amount (step 69).

In the embodiment described above, a cross point is calculated in accordance with the size of the display screen and images for the left and right eyes are adjusted in such a manner that the parallax at the calculated cross point vanishes. However, it may be arranged so that a blurring amount conforming to the size of the display screen is applied based upon the read reference blurring amount without calculating a cross point conforming to the display screen and without adjusting the images for the left and right eyes.

Figure 13:
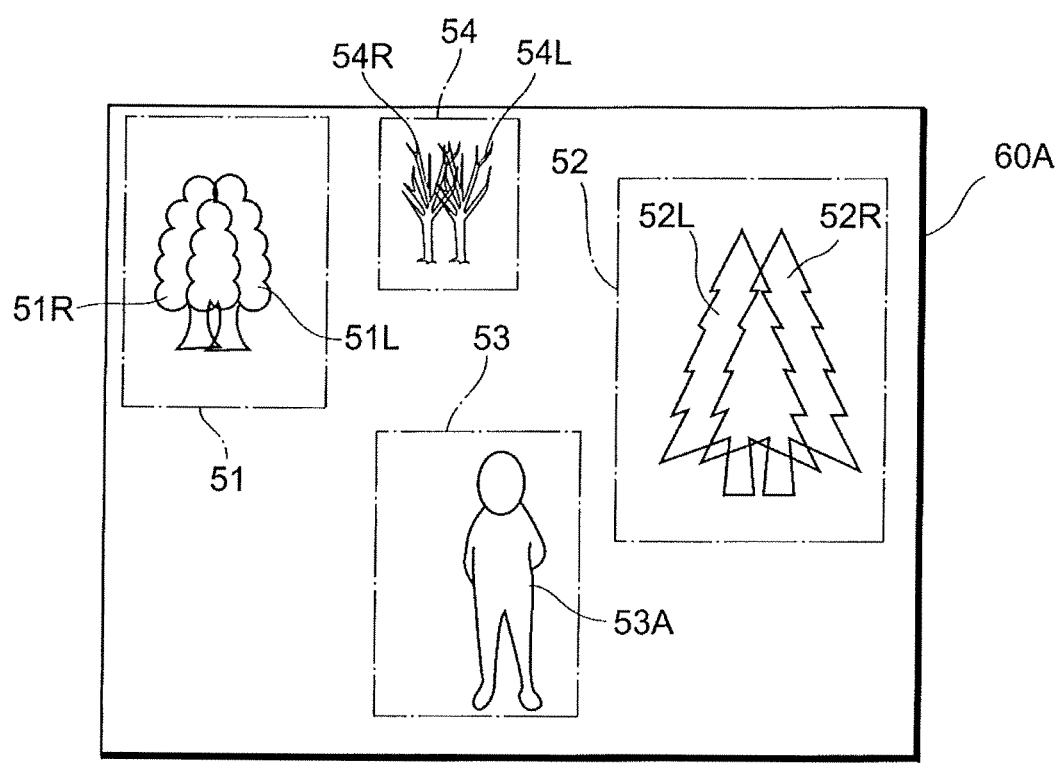
FIG. 13 is an example of a stereoscopic image.
Figure 14:
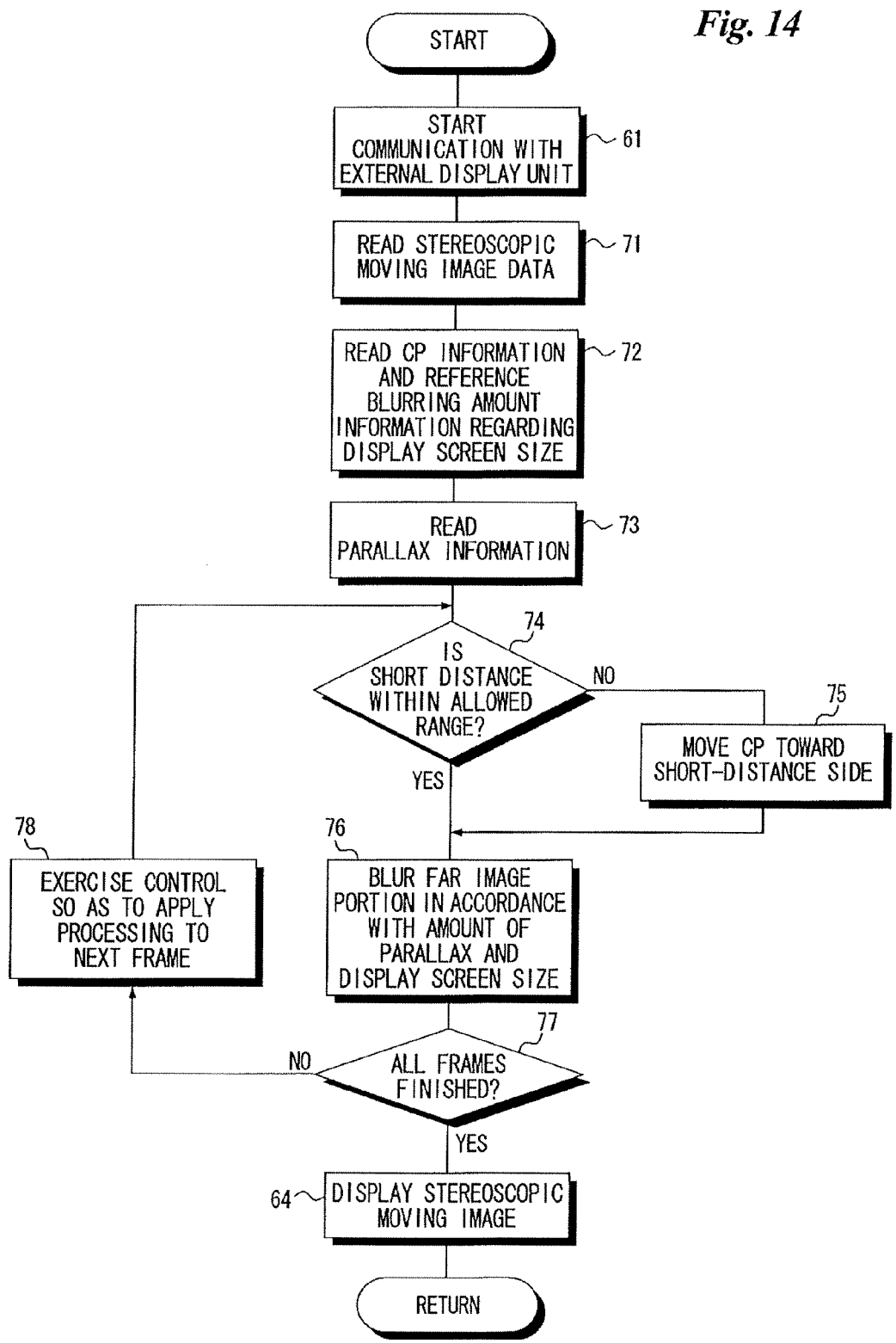
FIG. 14 is a flowchart illustrating a playback processing procedure.

FIGS. 13 and 14 illustrate another embodiment. This embodiment changes the cross point at the time of playback.

FIG. 13 is an example of a stereoscopic image displayed on a display screen.

A stereoscopic image 60A contains the first area 51, second area 52, third area 53 and fourth area 54 in a manner similar to the stereoscopic image 60 shown in FIG. 8. With the stereoscopic image 60 shown in FIG. 8, the second area 52 contains the cross point and the tree image 52A devoid of parallax is being displayed. By contrast, with the stereoscopic image 60A shown in FIG. 13, the cross point has been moved to the third area 53 that represents a subject shallower than the subject represented by the image portion contained in the second area 52. As a consequence, the tree images 52L and 52L within the second area 52 become overlapping images and the person image 53A within the third area 53 becomes an image devoid of parallax.

Although an image portion shallower than the cross point requires parallax in order to form a stereoscopic image, there are instances where viewing will become uncomfortable for the observer if there is too much parallax. For this reason, in a case where the parallax of an image portion shallower than the cross point of the stereoscopic image at the time of recording is equal to or greater than a prescribed threshold value, the cross point is moved shallower.

FIG. 14 is a flowchart illustrating a playback processing procedure.

The stereoscopic imaging digital camera and the external display apparatus 41 are connected and begin communicating (step 61). Stereoscopic moving image data that has been recorded on the memory card 40 is read (step 71). Further, cross-point information and reference blurring amount with respect to display screen size for every stereoscopic image constituting the stereoscopic moving image are read from the header of the file containing the stereoscopic moving image data (step 72). Furthermore, parallax information for every stereoscopic image also is read from the file (step 73). It goes without saying that the parallax information is generated at the time of recording of the stereoscopic moving image data and that it has been stored in the file header along with the cross-point information and reference blurring amount. Naturally, it may be arranged so that the parallax information is generated at the time of playback without being recorded beforehand.

It is determined whether the parallax of an image portion shallower than (a short distance from) the cross point at the time of recording of the stereoscopic image is within an allowed range (step 74). It is construed that parallax is outside the allowed range if the parallax is equal to or greater than a prescribed threshold value, and that parallax is within the allowed range if the parallax is less than the prescribed threshold value.

If parallax is not within the allowed range ("NO" at step 74), then the cross point is moved toward the short-distance side (shallower) (step 75). Parallax of an image portion representing a shallow subject vanishes, as illustrated in FIG. 13.

If parallax is within the allowed range ("YES" at step 74), then the image portion representing a subject farther than the cross point at the time of recording is caused to blur in accordance with amount of parallax and the display screen size of the external display unit (step 76). The more parallax a portion has, the more the amount of blurring is increased, and the larger the size of the display screen, the more the amount of blurring is increased.

In a case where the cross point is moved shallower, the image portion representing the subject farther than this cross point is caused to blur in accordance with the amount of parallax and display screen size of the external display unit (step 76).

If processing regarding the stereoscopic images of all frames that constitute the stereoscopic image is not finished ("NO" at step 77), then the stereoscopic imaging digital camera is controlled in such a manner that similar processing is applied to the stereoscopic image of the next frame (step 78), and the processing of steps 74 to 76 is repeated.

When processing regarding the stereoscopic images of all frames that constitute the stereoscopic image ends ("YES" at step 77), the stereoscopic moving image is displayed (step 64).

FIGS. 15 to 21 illustrate another embodiment. This embodiment arranges it so that in a case where the scene of a stereoscopic moving image changes, the observer will not be given an impression of a sudden change in scene.

Figure 15:
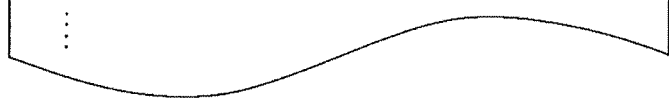
FIG. 15 illustrates the contents of a header.

FIG. 15 illustrates the contents of a header.

In this embodiment, a scene-change frame representing a frame in which the scene changes over has been recorded in the header in addition to the cross-point information. For example, a $134^{th}$ is a scene-change frame and there is a changeover between the scene of the stereoscopic moving image extending up to the $133^{rd}$ frame and the scene of the stereoscopic moving image from the $134^{th}$ frame onward.

Figure 16:
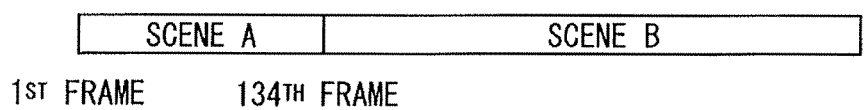
FIG. 16 illustrates the manner in which a scene changes.

FIG. 16 is a time chart representing scenes of a stereoscopic moving image.

Frames from the first frame to the $133^{rd}$ frame constitute the stereoscopic moving image of a scene A, and frames from the $134^{th}$ frame onward constitute the stereoscopic moving image of a scene B.

Figure 17:
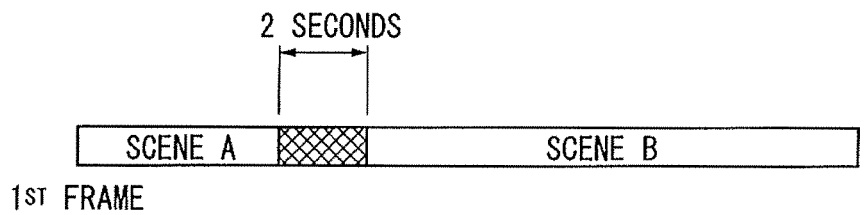
FIG. 17 illustrates the manner in which a scene changes over.

FIG. 17 is a time chart illustrating the timing at which stereoscopic images before and after the scene changeover of the stereoscopic moving image are caused to blur in their entirety.

As indicated by the hatching, stereoscopic images are displayed upon being blurred in their entirety over a total of two seconds, namely one second before and one second after the scene-change frame. Since the stereoscopic images before and after the scene change are blurred entirely, the observer is not imparted with a sense of oddness even though the scene changes.

Figure 18:
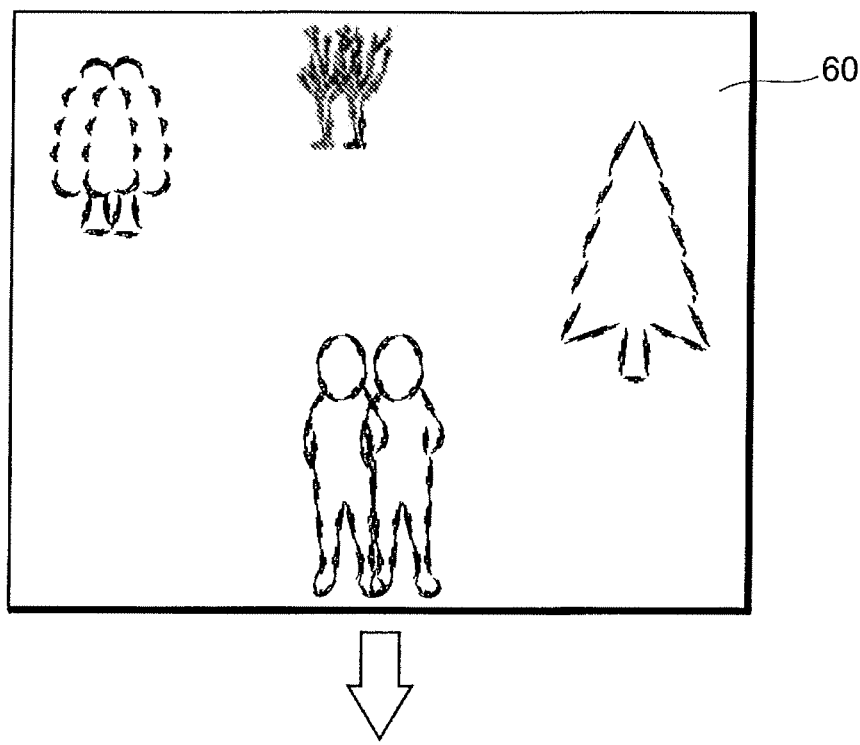
FIG. 18 illustrates how stereoscopic images appear when a scene changes over.
Figure 18:
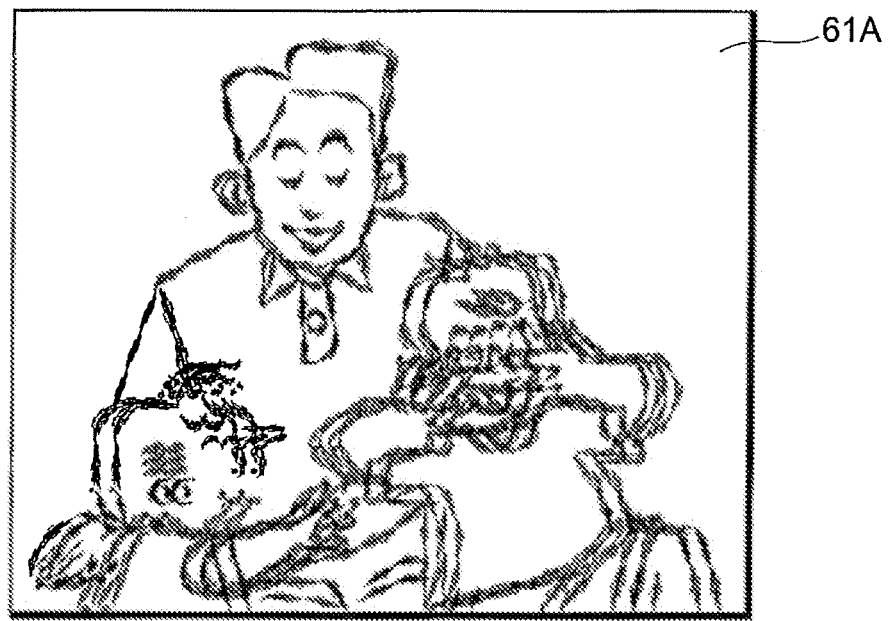

FIG. 18 illustrates an example of stereoscopic images.

The scene changes when stereoscopic image 60 of the $133^{rd}$ frame changes over to stereoscopic image 60A of the $134^{th}$ frame. Since stereoscopic images before and after a scene changes over are caused to blur entirely, as mentioned above, the observer is not imparted with a sense of oddness even though the scene changes.

Figure 19:
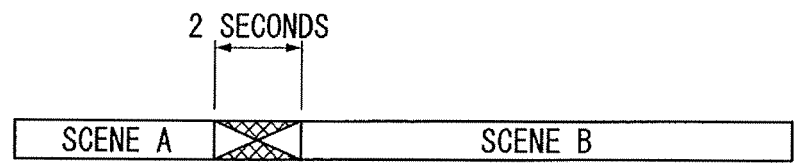
FIG. 19 illustrates the manner in which a scene changes over.

FIG. 19, which illustrates a modification, is a time chart illustrating the timing at which stereoscopic images before and after a scene changeover of a stereoscopic moving image are caused to blur in their entirety.

In the foregoing embodiment, stereoscopic images are caused to blur entirely before and after the scene changes over. In this embodiment, however, stereoscopic images of a plurality of frames preceding the changeover of the scene are displayed in gradually decreasing size, and stereoscopic images of a plurality of frames following the scene changeover gradually increase in size and take on the original size of the stereoscopic image.

Figure 20:
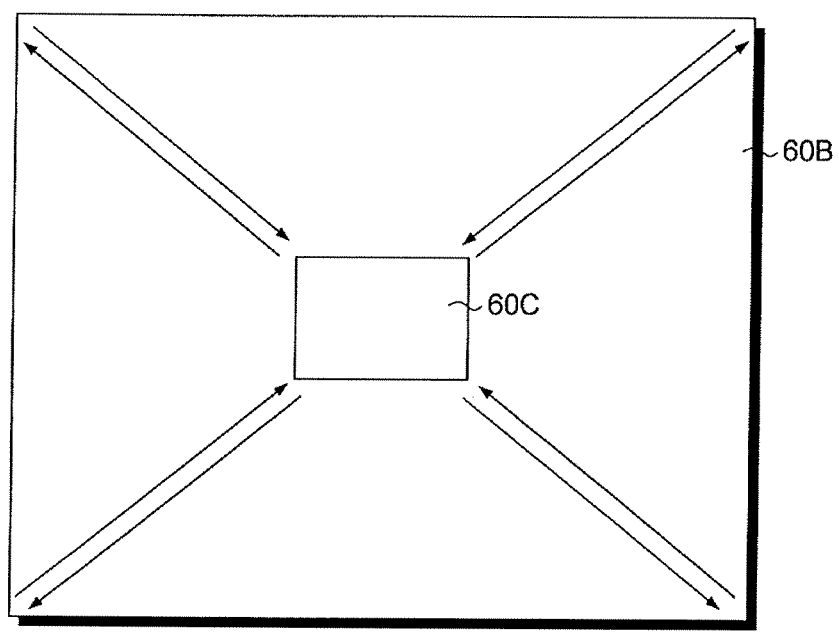
FIG. 20 illustrates the manner in which the size of stereoscopic images changes when a scene changes over.

FIG. 20 illustrates the manner in which the size of stereoscopic images changes before and after a scene changes over.

As mentioned above, stereoscopic images of a plurality of frames preceding the changeover of the scene gradually decrease in size from an original size 60B of the stereoscopic image, and the image of the frame immediately preceding the scene changeover or of the frame in which the scene changes over takes on the smallest size 60C. After the scene changes over, the sizes of the images gradually increase and take on the size 60B of the original stereoscopic image.

Figure 21:
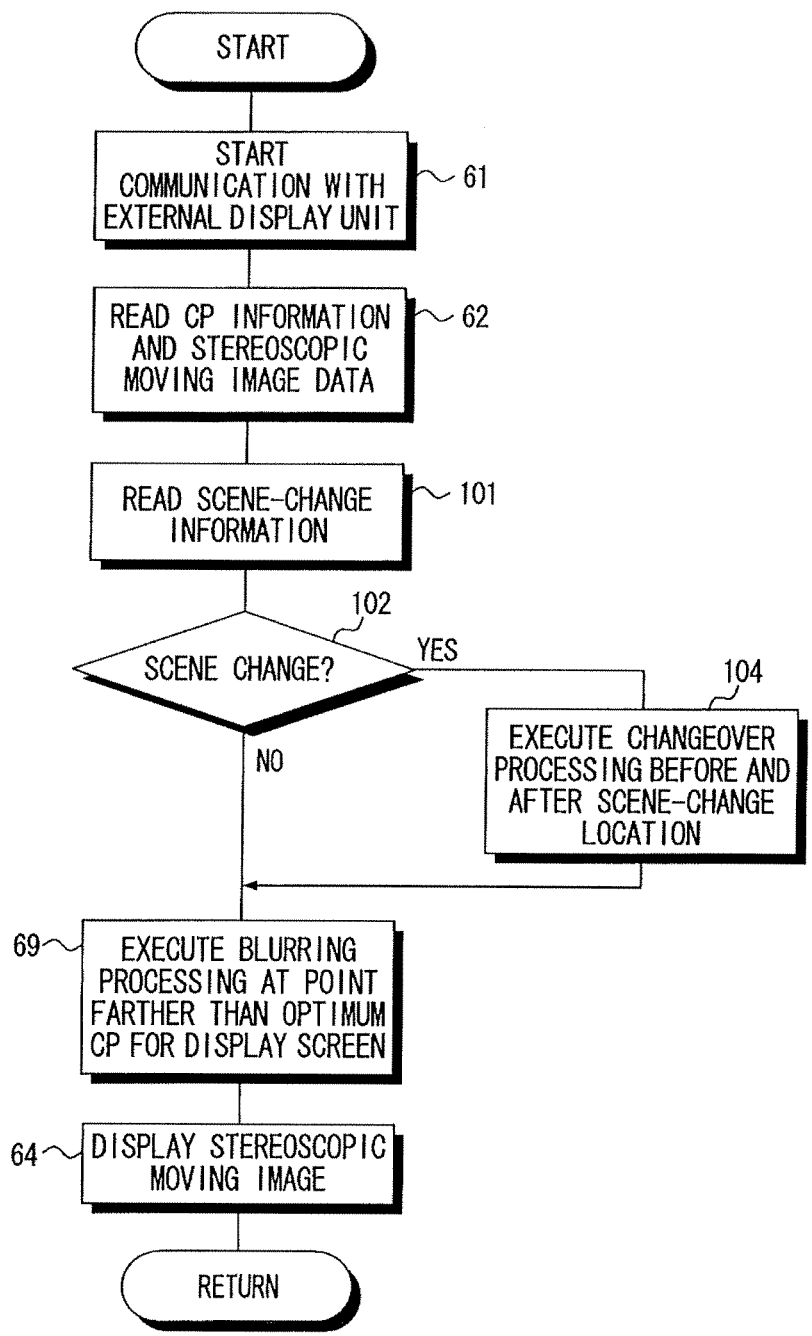
FIG. 21 is a flowchart illustrating a playback processing procedure.

FIG. 21, which corresponds to FIG. 6, is a flowchart illustrating a playback processing procedure. Processing in FIG. 21 identical with that shown in FIG. 6 is designated by like reference characters and a description thereof is omitted.

Scene-change information that has been recorded on the memory card 40 is read (step 101). When a scene changes over ("YES" at step 102), processing such as processing for blurring in their entirety stereoscopic images before and after the scene changeover and for reducing and enlarging stereoscopic images, as described above, is executed (step 104). Thereafter, processing for blurring an image portion representing a subject farther than the cross point is executed (step 69), as described above. If there is no scene changeover ("NO" at step 102), then step 104 is skipped.

In the foregoing embodiments, the processing shown in FIG. 6, the processing shown in FIG. 9, the processing shown in FIG. 12, the processing shown in FIG. 14 and the processing shown in FIG. 21 appear in the drawings as processes that are separate from one another. However, any number of these processes may be combined. For example, from among the processing shown in FIG. 9, the processing shown in FIG. 12, the processing shown in FIG. 14 and the processing shown in FIG. 21, one or any number of the processes may be combined with the processing shown in FIG. 6; from among the processing shown in FIG. 12, the processing shown in FIG. 14 and the processing shown in FIG. 21, one or any number of the processes may be combined with the processing shown in FIG. 9; either or both of the processing shown in FIGS. 14 and 21 may be combined with the processing shown in FIG. 12; and the processing shown in FIG. 14 and the processing shown in FIG. 21 may be combined.

Furthermore, in the foregoing embodiments, a stereoscopic image is caused to blur in such a manner that the deeper an image portion relative to a cross point, the larger the amount of blurring becomes. However, it may be arranged so that the shallower an image portion relative to a cross point, the more the stereoscopic image is caused to blur. Thus, the processing for blurring a stereoscopic image more the shallower an image portion is relative to the cross point may just as well be executed in the above-mentioned processing shown in FIG. 9, processing shown in FIG. 12, processing shown in FIG. 14 or processing shown in FIG. 21, or it may be executed in any combination of these. It goes without saying that such blurring processing can be implemented using a smoothing filter.

The invention claimed is:

1. A stereoscopic image display control apparatus, comprising:
    a stereoscopic image data reading unit for reading stereoscopic image data representing a stereoscopic image that has been recorded on a recording medium;
    a cross-point information reading unit for reading cross-point information that has been recorded on the recording medium and that represents a cross point at which parallax of the stereoscopic image vanishes;
    a first blurring unit for blurring an image portion, which represents a subject at a position deeper than the cross point represented by the cross-point information read by said cross-point information reading unit, in the stereoscopic image represented by the stereoscopic image data read by said stereoscopic image data reading unit, in such a manner that the deeper the subject relative to the cross point, the greater the amount of blurring becomes;
    a display control unit for controlling a display device so as to display the stereoscopic image in which the image portion representing the subject at the deeper position has been blurred by said first blurring unit;
    a parallax determination unit for determining whether parallax of an image portion representing a subject at a position shallower than the cross point in the stereoscopic image is equal to or greater than a threshold value; and
    a cross-point control unit, responsive to a determination by said parallax determination unit that parallax of the image portion representing the subject at the position shallower than the cross point is equal to or greater than the threshold value, for controlling the stereoscopic image data so as to move the cross point to an image portion representing a subject shallower than the position of the cross point represented by cross-point information read by said cross-point information reading unit in the stereoscopic image,
    wherein, if said parallax is outside an allowed range, then the cross point is moved toward a short-distance side, and
    wherein, if said parallax is within an allowed range then the image portion representing a subject farther than the cross point at a time of recording is caused to blur in accordance with an amount of said parallax.

2. A stereoscopic image display control apparatus according to claim 1, wherein said first blurring unit blurs an image portion, which represents a subject at a position deeper than the cross point detected by said cross point detection unit in the stereoscopic image, in such a manner that the larger a display screen of the display device, the greater the amount of blurring becomes.

3. A stereoscopic image display control apparatus according to claim 1, wherein said stereoscopic image is an image of a single frame constituting a stereoscopic moving image, said stereoscopic image data reading unit reads stereoscopic image data, which represents stereoscopic images of a number of frames, from the recording medium, and scene-change information representing a frame of the stereoscopic image in which a scene of the stereoscopic image changes has been recorded on the recording medium, said apparatus further comprising:

a scene-change information reading unit for reading the scene-change information from the recording medium; and a second blurring unit for blurring the entirety of stereoscopic images of scene-change frames which are one or a plurality of frames preceding and following a frame of the stereoscopic image represented by scene-change information read by said scene-change information reading unit;

wherein said display control unit controls the display device so as to display stereoscopic images, which have been blurred by said first blurring unit, with regard to said stereoscopic images of frames other than the scene-change frames, and so as to display stereoscopic images, which have been blurred by said first and second blurring units, with regard to the stereoscopic images of the scene-change frames.

4. A stereoscopic image display control apparatus according to claim 3, wherein said display control unit controls the display device so as to display the stereoscopic images in such a manner that stereoscopic images of the scene-change frames are gradually reduced from large to small up to a stereoscopic image preceding the stereoscopic image in which the scene of the stereoscopic image changes, and are gradually enlarged from small to large following the stereoscopic image in which the scene of the stereoscopic image changes.

5. A stereoscopic image display control apparatus according to claim 4, further comprising a second blurring unit for blurring an image portion, which represents a subject at a position shallower than the cross point represented by cross-point information read by said cross-point information reading unit, in the stereoscopic image represented by stereoscopic image data read by said stereoscopic image data reading unit, in such a manner that the shallower the subject relative to the cross point, the more the amount of blurring becomes.

6. A stereoscopic image display control apparatus according to claim 1, wherein, if said parallax is within the allowed range, then the image portion representing the subject farther than the cross point at the time of recording is caused to blur in accordance with the amount of said parallax and a display screen size of the display device.

7. A method of controlling operation of a stereoscopic image display control apparatus, said method comprising:

reading, by a stereoscopic image data reading unit, stereoscopic image data representing a stereoscopic image that has been recorded on a recording medium;

reading, by a cross-point information reading unit, cross-point information that has been recorded on the recording medium and that represents a cross point at which parallax of the stereoscopic image vanishes;

blurring, by a first blurring unit, an image portion, which represents a subject at a position deeper than the cross point represented by the cross-point information read by said cross-point information reading unit, in said stereoscopic image represented by the stereoscopic image data read by said stereoscopic image data reading unit, in such a manner that the deeper the subject relative to the cross point, the greater the amount of blurring becomes;

controlling, by a display control unit, a display device so as to display the stereoscopic image in which the image portion representing the subject at the deeper position has been blurred by said first blurring unit;

determining, by a parallax determination unit, whether parallax of an image portion representing a subject at a position shallower than the cross point in the stereoscopic image is equal to or greater than a threshold value; and responsive to a determination by said parallax determination unit that the parallax of the image portion representing the subject at the position shallower than the cross point is equal to or greater than a threshold value, controlling, by a cross-point control unit, the stereoscopic image data so as to move the cross point to an image portion representing a subject shallower than the position of the cross point represented by cross-point information read by said cross-point information reading unit in the stereoscopic image, wherein, if said parallax is outside an allowed range, then the cross point is moved toward a short-distance side, and wherein, if said parallax is within an allowed range, then the image portion representing a subject farther than the cross point at a time of recording is caused to blur in accordance with an amount of said parallax.

* * * * *